United States Patent
Prock et al.

(10) Patent No.: US 9,503,942 B1
(45) Date of Patent: Nov. 22, 2016

(54) SELECTION OF AIR INTERFACE PROTOCOL BASED ON SPECTRAL EFFICIENCY

(71) Applicant: Sprint Spectrum L.P., Overland Park, KS (US)

(72) Inventors: John W. Prock, Raymore, MO (US); Young Zhao, Overland Park, KS (US); Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 454 days.

(21) Appl. No.: 14/136,074

(22) Filed: Dec. 20, 2013

(51) Int. Cl.
*H04W 4/00* (2009.01)
*H04W 36/00* (2009.01)

(52) U.S. Cl.
CPC ............................... *H04W 36/0066* (2013.01)

(58) Field of Classification Search
CPC ................................................. H04W 36/0066
USPC ......................................................... 370/331
See application file for complete search history.

(56) References Cited

U.S. PATENT DOCUMENTS

| | | | | |
|---|---|---|---|---|
| 2004/0266435 A1* | 12/2004 | de Jong | ................ | H04W 36/14 455/436 |
| 2009/0109930 A1* | 4/2009 | Suh | ........................ | H04W 36/26 370/332 |
| 2009/0213819 A1* | 8/2009 | Kalhan | ................. | H04W 48/12 370/338 |
| 2010/0325714 A1* | 12/2010 | Iyer | ....................... | H04W 12/06 726/8 |
| 2012/0115460 A1* | 5/2012 | Lin | ................... | H04W 36/0083 455/423 |
| 2012/0322499 A1* | 12/2012 | Wei | ....................... | H04W 36/24 455/525 |
| 2014/0321282 A1* | 10/2014 | Pragada | ........... | H04W 36/0072 370/235 |
| 2015/0146696 A1* | 5/2015 | Golitschek Edler Von Elbwart | ................ | H04W 24/10 370/335 |

* cited by examiner

*Primary Examiner* — Peter Cheng

(57) ABSTRACT

A method and system is disclosed for selection of an air interface protocol based on spectral efficiency (SE). When a request for service is received from a wireless communication device on a first air interface, a requested SE of the request will be determined, and a first ratio of the requested SE to an average SE on the first air interface computed. If the first ratio is greater than a threshold, the requested service will be provided on the first air interface. Otherwise, a projected SE of providing the requested service on a second air interface will be determined, and a second ratio of the projected SE to an average SE on the second air interface computed. If the first ratio is greater than the second ratio, the requested service will be provided on the first air interface. Otherwise, the requested service will be provided on the second air interface.

20 Claims, 7 Drawing Sheets

400

| CQI TABLE | | | |
|---|---|---|---|
| CQI Index | Modulation | Code Rate | Spectral Efficiency (bits/Hz) |
| 1 | QPSK | 0.076 | 0.1523 |
| 2 | QPSK | 0.12 | 0.2344 |
| 3 | QPSK | 0.19 | 0.0377 |
| 4 | QPSK | 0.3 | 0.6016 |
| 5 | QPSK | 0.44 | 0.877 |
| 6 | QPSK | 0.59 | 1.1758 |
| 7 | 16QAM | 0.37 | 1.4766 |
| 8 | 16QAM | 0.48 | 1.9141 |
| 9 | 16QAM | 0.6 | 2.4063 |
| 10 | 64QAM | 0.45 | 2.7305 |
| 11 | 64QAM | 0.55 | 3.3223 |
| 12 | 64QAM | 0.65 | 3.9023 |
| 13 | 64QAM | 0.75 | 4.5234 |
| 14 | 64QAM | 0.85 | 5.1152 |
| 15 | 64QAM | 0.93 | 5.5547 |

FIG. 4

| SINR UPPER LIMIT (dB) | DRC CODE | FORWARD-LINK DATA RATE (kbps) | PACKET LENGTH (Slots) |
|---|---|---|---|
| -10.4 | 0 | Null | N/A |
| -7.6 | 1 | 38.4 | 16 |
| -4.6 | 2 | 76.8 | 8 |
| -2.8 | 3 | 153.6 | 4 |
| -1.5 | 4 | 407.2 | 2 |
| 0.5 | 5 | 407.2 | 4 |
| 1.6 | 6 | 614.4 | 1 |
| 3.4 | 7 | 614.4 | 2 |
| 4.8 | 8 | 921.6 | 2 |
| 5.9 | 9 | 1,228.8 | 1 |
| 8.1 | 10 | 1,228.8 | 2 |
| 10.4 | 11 | 1,843.2 | 1 |
| 11.8 | 12 | 2,457.6 | 1 |

FIG. 5

SELECTION OF AIR INTERFACE PROTOCOL BASED ON SPECTRAL EFFICIENCY

BACKGROUND

In a typical cellular radio communication system (wireless communication system), an area is divided geographically into a number of cell sites, each defined by a radio frequency (RF) radiation pattern from a respective antenna or antenna system. The antennas in the cells are in turn coupled to one or another form of controller, which is then coupled to a telecommunications switch or gateway, such as a mobile switching center (MSC) and/or a packet data serving node (PDSN) for instance. These (and possibly other) elements function collectively to form a Radio Access Network (RAN) of the wireless communication system. The switch or gateway may then be coupled with a transport network, such as the PSTN or a packet-switched network (e.g., the Internet).

Depending on the specific underlying technologies and architecture of a given wireless communication system, the RAN elements may take different forms. In a code division multiple access (CDMA) system configured to operate according IS-2000 and IS-856 standards, for example, the antenna system is referred to as a base transceiver system (BTS), and is usually under the control of a base station controller (BSC). In a universal mobile telecommunications system (UMTS) configured to operate according to ITU IMT-2000 standards, the antenna system is usually referred to as a NodeB, and is usually under the control of a radio network controller (RNC). Other architectures and operational configurations of a RAN are possible as well.

A subscriber (or user) in a service provider's wireless communication system accesses the system for communication services via a Wireless Communication Device ("WCD"), such as a cellular telephone, "smart" phone, pager, or appropriately equipped portable computer, for instance. In a CDMA system a WCD is referred to as an access terminal ("AT"); in a UMTS system a WCD is referred to as User Equipment ("UE"). For purposes of the discussion herein, the term WCD will be used to refer to either an AT or UE or the like. When a WCD is positioned in a cell, it communicates via an RF air interface with the BTS or NodeB antenna of the cell. Consequently, a communication path or "channel" is established between the WCD and the transport network, via the air interface, the BTS or NodeB, the BSC or RNC, and the switch or gateway.

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS or NodeB, or by respective antennas. These sectors can be referred to as "physical sectors," since they are physical areas of a cell site. Therefore, at any given instant, a WCD in a wireless network will typically be positioned in a given physical sector and will be able to communicate with the transport network via the BTS or NodeB serving that physical sector.

The functional combination of a BTS of a cell or sector with a BSC, or of a NodeB and an RNC, is commonly referred to as a "base station." The actual physical of a configuration of a base station can range from an integrated BTS-BSC or NodeB-RNC unit to a distributed deployment of multiple BTSs under a single BSC, or multiple NodeBs under a single RNC. A base station may be typically deployed to provide coverage over a geographical area on a scale of a few to several square miles and for tens to hundreds to several thousands (or more) of subscribers at any one time.

As a subscriber at a WCD moves between wireless coverage areas of a wireless communication system, such as between cells or sectors, or when network conditions change or for other reasons, the WCD may "hand off" from operating in one coverage area to operating in another coverage area. In a usual case, this handoff process is triggered by the WCD monitoring the signal strength of various nearby available coverage areas, and the BSC or RNC (or other controlling network entity) determining when one or more threshold criteria are met. For instance, a WCD may continuously monitor signal strength from various available sectors and notify a BSC when a given sector has a signal strength that is sufficiently higher than the sector in which the WCD is currently operating. The BSC may then direct the WCD to hand off to that other sector. By convention, a WCD is said to handoff from a "source" cell or sector (or base station) to a "target" cell or sector (or base station).

In some wireless communication systems or markets, a wireless service provider may implement more than one type of air interface protocol. For example, a carrier may support one or another version of CDMA, such as EIA/TIA/IS-2000 Rel. 0, A, and CDMA 2000 Spread Spectrum Systems Revision E (collectively referred to generally herein as "IS-2000") for both circuit-cellular voice and data traffic, as well as a more exclusively packet-data-oriented protocol such as EIA/TIA/IS-856 Rel. 0, A, or other version thereof (hereafter "IS-856"). Under IS-2000, packet-data communications may be referred to as 1X Radio Transmission Technology ("1X-RTT") communications, also abbreviated as just "1X." However, since IS-2000 supports both circuit voice and packet data communications, the term 1X (or 1X-RTT) is sometimes used to more generally refer the IS-2000 air interface, without regard to the particular type of communication carried. Packet-data communications under IS-856 are conventionally referred to as Evolution-Data Optimized ("EVDO") communications, also abbreviated as just "DO." A carrier could also implement an orthogonal frequency division multiple access (OFDMA) based system according to protocols specified by third generation partnership project (3GPP) Long Term Evolution ("LTE") Advanced, for example. WCDs may be capable of communication under any or all such protocols, and may further be capable of handing off between them, in addition to being able to hand off between various configurations of coverage areas.

OVERVIEW

As noted above, a WCD may be capable of operating under more than one air-interface protocol. More particularly, a WCD may include one or more transceiver components that, coupled with one or more antennas, provide a multi-technology air interface capable of transmitting and receiving wireless signals according to each of multiple, different physical radio transmission/reception technologies. A multi-technology air interface can be viewed as including multiple air interfaces, each based on a respective air-interface technology, and each configured to operate according to a respective air-interface protocol. Such a WCD may thus be capable of operating under various, different air interface protocols, and/or according to various, different air-interface technologies. For operation in the context of a RAN, an air-interface technology may also be considered a radio access technology. Expanding on the list of examples given above, different air-interface technologies and protocols could include 1×RTT, 1×EV-DO, LTE, WiMAX, iDEN, TDMA, AMPS, GSM, GPRS, UMTS, EDGE, MMDS, WI-FI, and BLUETOOTH, for example.

Also as noted above, a service provider may operate RANs that support multiple air interface technologies. For example, a service provider's wireless communication system could include CDMA RANs for voice calls, and both EVDO RANs and LTE RANs for data. Further, air interface components of different RANs could be deployed to provide neighboring coverage, overlapping coverage, and/or co-located coverage for CDMA, EVDO, and LTE (or other air interface technologies). For example, CDMA and EVDO air interfaces are sometimes configured in co-located hybrid BTS/BSC systems of what is referred to herein as a "CDMA/EVDO" RAN. LTE air interfaces could be configured in neighboring or co-located LTE RANs such that LTE and CDMA/EVDO services overlap within at least some regions of the wireless communication system.

In such wireless communication system, a multi-technology WCD might place and receive voice calls on the CDMA air interface, and might obtain data services on the LTE air interface or the EVDO air interface. For data services in particular, it may happen that LTE is a default or preferred type of service when both LTE and EVDO air interfaces are available for providing service to a WCD. This could be the case, for example, because LTE typically (but not always) supports generally higher data transmission rates (e.g., bits per second). However, it can also be the case that for a given data rate, the spectral efficiency (i.e., bits per second per bandwidth used) of LTE service compared to that of EVDO service is such that EVDO service might be a better and/or advantageous choice. It would therefore be desirable to be able to consider relative spectral efficiencies of LTE and EVDO service when selecting which to provide to a WCD. Accordingly, example embodiments herein provide for selection of an air interface for service based on spectral efficiency.

Hence, in one respect, various embodiments of the present invention provide, in a communication system comprising a first radio access network (RAN) configured to serve wireless communication devices (WCDs) on a first air interface according to a first air interface protocol, a second RAN configured to serve WCDs on a second air interface according to a second air interface protocol, and a network device communicatively connected to both the first and second RANs, a method comprising: at the network device, receiving information indicative of a requested spectral efficiency for a service to be provided by the first RAN to a WCD, the first RAN having received a request for the service from the WCD on the first air interface, and the information having been included in the request for the service; based on the information, determining by the network device the requested spectral efficiency for providing the requested service on the first air interface of the first RAN according to the first air interface protocol; and the network device making a determination to provide the WCD the requested service on one of (i) the first air interface of the first RAN according to the first air interface protocol, or (ii) the second air interface of the second RAN according to the second air interface protocol, the determination being based on a comparison of the requested spectral efficiency to at least one of (a) a threshold, or (b) a projected spectral efficiency for providing the requested service on the second air interface of the second RAN according to the second air interface protocol.

In another respect, various embodiments of the present invention provide a network device comprising: at least one network communication interface communicatively coupled to both a first radio access network (RAN) and a second RAN, wherein the first RAN is configured to serve wireless communication devices (WCDs) on a first air interface according to a first air interface protocol, and the second RAN is configured to serve WCDs on a second air interface according to a second air interface protocol; one or more processors; memory accessible by the one or more processors; and machine-readable instructions stored in the memory, that upon execution by the one or more processors cause the network device to carry out functions including: receiving information indicative of a requested spectral efficiency for a service to be provided by the first RAN to a WCD, wherein the information is received from the first RAN upon receipt by the first RAN of a request for the service from the WCD on the first air interface, and the information is included in the request for the service, based on the information, determining the requested spectral efficiency for providing the requested service on the first air interface of the first RAN according to the first air interface protocol, and making a determination to provide the WCD the requested service on one of (i) the first air interface of the first RAN according to the first air interface protocol, or (ii) the second air interface of the second RAN according to the second air interface protocol, wherein the determination is based on a comparison of the requested spectral efficiency to at least one of (a) a threshold, or (b) a projected spectral efficiency for providing the requested service on the second air interface of the second RAN according to the second air interface protocol.

In still another respect, various embodiments of the present invention provide a non-transitory computer-readable medium having instructions stored thereon that, upon execution by one or more processors of a network device communicatively coupled to both a first radio access network (RAN) configured to serve wireless communication devices (WCDs) on a first air interface according to a first air interface protocol, and a second RAN configured to serve WCDs on a second air interface according to a second air interface protocol, cause the network device to carry out functions including: receiving information indicative of a requested spectral efficiency for a service to be provided by the first RAN to a WCD, wherein the information is received from the first RAN upon receipt by the first RAN of a request for the service from the WCD on the first air interface, and the information is included in the request for the service; based on the information, determining the requested spectral efficiency for providing the requested service on the first air interface of the first RAN according to the first air interface protocol; and making a determination to provide the WCD the requested service on one of (i) the first air interface of the first RAN according to the first air interface protocol, or (ii) the second air interface of the second RAN according to the second air interface protocol, wherein the determination is based on a comparison of the requested spectral efficiency to at least one of (a) a threshold, or (b) a projected spectral efficiency for providing the requested service on the second air interface of the second RAN according to the second air interface protocol.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

BRIEF DESCRIPTION OF THE DRAWINGS

FIG. 4 is an example table of channel quality index that could be used in selecting an air interface protocol based on spectral efficiency, in accordance with example embodiments.

FIG. 5 is an example table of data rate parameters that could be used selecting an air interface protocol based on spectral efficiency, in accordance with example embodiments.

DETAILED DESCRIPTION

Example embodiments presented herein will be described by way of example with reference to wireless communication systems. It will be appreciated that wireless communication systems can employ a range of technologies designed to operate according to a number of related standards and protocols, including, without limitation, LTE Advanced, IS-2000, IS-856 (EVDO), IMT-2000, WiMax, and WiFi, among others, in order to deliver both circuit-cellular and wireless packet-data services. Underlying access technologies include CDMA, time division multiple access (TDMA), and orthogonal frequency division multiple access (OFDMA), among others.

Wireless communications systems can generally be classified under the umbrella of one or another representative system architecture. One example is a "CDMA network," which, despite its label, can include both CDMA-based wireless access (e.g., as specified under IS-2000) and TDMA-based wireless access (e.g., as specified under IS-856), among other technologies. The terms "EVDO" and "CDMA/EVDO" will be used interchangeably herein in reference to data services in a CDMA network, unless specified otherwise. Other examples of representative architectures include "UMTS networks," which also can include CDMA-based wireless access (e.g., as specified under IMT-2000), and "LTE Advanced networks," which can include OFDMA-based wireless access, and are sometimes considered as next-generation variants of, and deployed within, UMTS networks. For purposes of the discussion herein, the terms "LTE" and "LTE Advanced" will be used interchangeably, unless specified otherwise.

Figure 1:
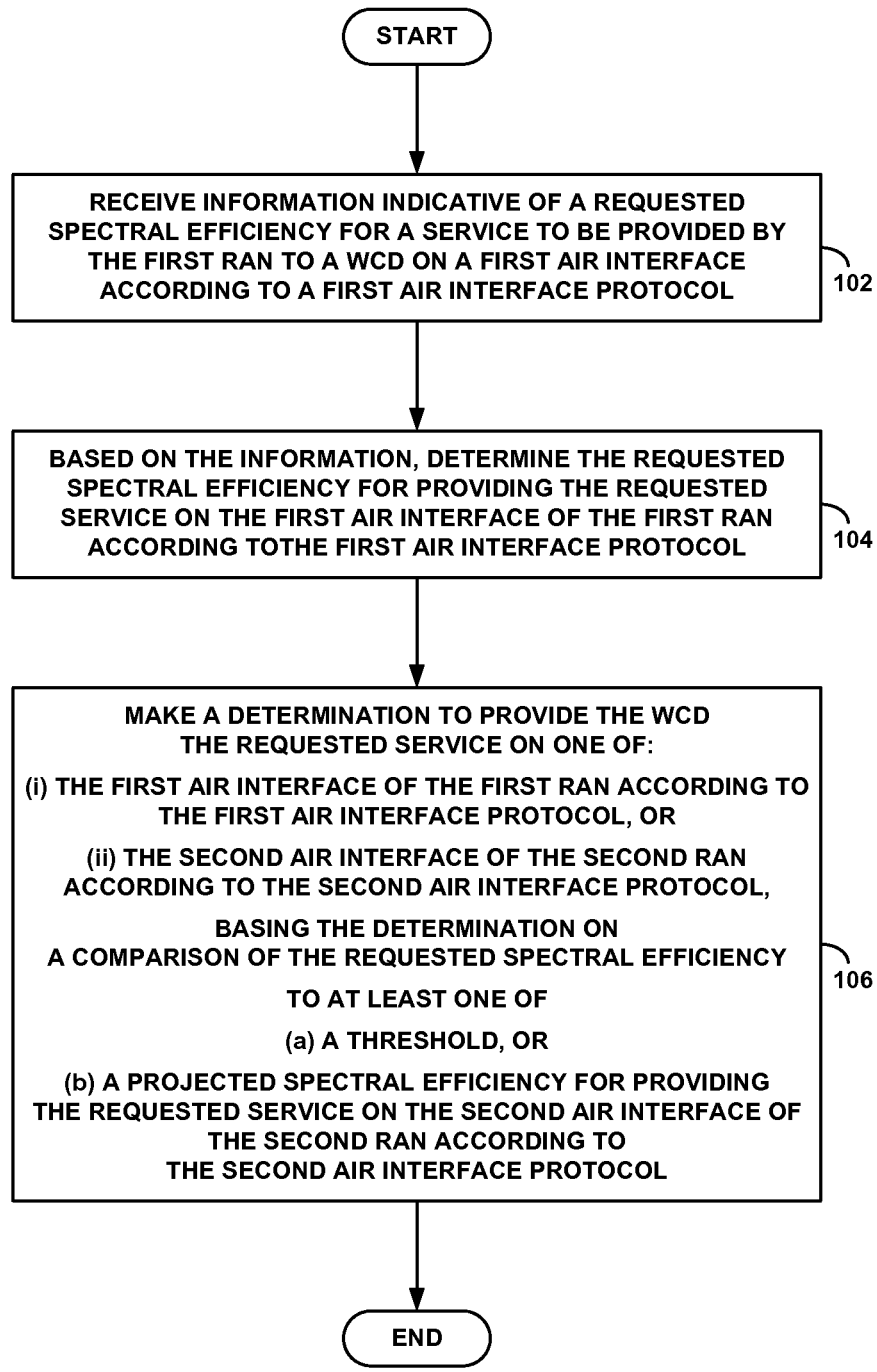
FIG. 1 is a flowchart depicting an example embodiment of a method selection of an air interface protocol based on spectral efficiency, in accordance with example embodiments.

FIG. 1 is a flowchart depicting an example embodiment of a method of selection of an air interface protocol based on spectral efficiency, carried out by a network device communicatively connected to both a first RAN and a second RAN of a wireless communication system. In accordance with example embodiments, the first RAN could be configured to serve WCDs on a first air interface according to a first air interface protocol, and the second RAN could be configured to serve WCDs on a second air interface according to a second air interface protocol. By way of example, the first RAN could be configured to operate according to LTE, with one or more LTE air interfaces, and could include one or more eNodeBs or other LTE base station devices. Also by way of example, the second RAN could be configured to operate according to EVDO or UMTS, with one or more EVDO or UMTS air interfaces, and could include one or more BTSs, eNodeBs, mobility management entities (MMEs), BSC, and/or RNCs.

The steps of the flowchart in FIG. 1 could be implemented as machine-language instructions stored in a non-transient computer readable medium of the network device, and executable by one or more processors of the network device in order to cause the network device to carry out the functions and operations described by way of example below. Non-limiting examples of the network device could include a BSC, eNodeB, MME, or other RAN component or network node configured to operate in a wireless communication system.

At step 102, the network device receives information indicative of a requested spectral efficiency for a service to be provided by the first RAN to a WCD. More particularly, the first RAN could receive a request for the service from the WCD on the first air interface, and the request could include the information indicating the requested spectral efficiency for the requested service. Upon receiving the service request, the first RAN could then send the information to the network device.

At step 104, the network device could use the received information to determine the requested spectral efficiency for providing the requested service on the first air interface of the first RAN according to the first air interface protocol. By way of example, if the first air interface protocol is taken to be LTE, then the information could be a channel quality indicator (CQI) index included by the WCD in its service request to the first RAN. The network device could then determine the requested spectral efficiency by looking up the CQI index in a CQI table in its non-transient computer readable medium (or other form of memory), and determining a tabulated spectral efficiency associated with the CQI index. Other forms of information indicative of requested spectral efficiency could be used as well, as could other techniques for determining the requested spectral efficiency from the information.

Finally, at step 106, the network device could make a determination to provide the WCD the requested service either on (i) the first air interface of the first RAN according to the first air interface protocol, or on (ii) the second air interface of the second RAN according to the second air interface protocol. In accordance with example embodiments, the determination could be made by comparing the requested spectral efficiency to either (a) a threshold, or (b) a projected spectral efficiency for providing the requested service on the second air interface of the second RAN according to the second air interface protocol. Furthermore, the comparison could involve both the threshold and the projected spectral efficiency, as described below.

In accordance with example embodiments, making the determination of which of the first or second RANs should provide the requested service could entail evaluating the requested and projected spectral efficiencies for providing the requested service, in view of average spectral efficiencies measured on the respective first and second air interfaces. More particularly, the network device could determine a first ratio of the requested spectral efficiency to a first average spectral efficiency measured on the first air interface of the first RAN. The network device could then compare the determined first ratio to a threshold value. If the determined first ratio is found to be greater than or equal to the threshold, then the network device could select the first air interface for providing the requested service to the WCD, and the first RAN could provide the requested service according to the first air interface protocol.

If instead the determined first ratio is found to be less than the threshold, then the network device could make a further determination involving the projected spectral efficiency. Specifically, in this case, the network device could determine a second ratio of the projected spectral efficiency to a second average spectral efficiency measured on the second air interface of the second RAN. The network device could then compare the determined first ratio to the determined second ratio. If the determined first ratio is found to be greater than or equal to the determined second ratio, in addition to having already been found to be less than the threshold, then the network device could again select the first air interface for providing the requested service to the WCD, and the first RAN could provide the requested service according to the first air interface protocol.

If instead, the determined first ratio is found to be less than the determined second ratio, in addition to having already been found to be less than the threshold, then the network device could select the second air interface for providing the requested service to the WCD. In this case, the second RAN could provide the requested service according to the second air interface protocol.

In accordance with example embodiments, the first average spectral efficiency could correspond to a running time average of spectral efficiencies of communications carried on the first air interface between the first RAN and one or more other WCDs served by the first RAN. Again assuming, by way of example, that the first air interface protocol is LTE, then the network device could maintain a record of CQI indexes of communication services provided by the first RAN over a time window reaching backward from the time at which the WCD request of step 102 was received. Each of the CQI indexes in the window could be translated to an associated spectral efficiency and all associated spectral efficiencies could be averaged to determine the first average spectral efficiency. It will be appreciated that other forms of time averaged spectral efficiency could be devised. For example, a time weighting (e.g., respective duration of each communication service) could be applied to each of the spectral efficiencies during the time window, the weighted spectral efficiencies summed, and the sum divided by the duration of the time window (or divided by the sum of the weighting factors). Furthermore, the time window could be defined in different ways with respect to duration, and the times at its boundaries (beginning and ending points). Further still, the network device could query the first RAN for the average spectral efficiency.

Also in accordance with example embodiments, the network device could determine the second ratio of the projected spectral efficiency to the second average spectral efficiency by first determining the projected spectral efficiency for providing the requested service on the second air interface of the second RAN. More specifically, the network device could first query the WCD for an indication of a projected data rate that can be supported on the second air interface from the second RAN. For example, if the second RAN has an EVDO air interface and operates according EVDO, the network device could send request to the WCD via the first RAN for a "data rate control" (DRC) value. As explained below, a WCD monitors a signal-to-noise ratio on a forward link from its serving base station to determine a supported data rate. The supported data rate is encoded in a DRC request, and transmitted to the serving base station. Thus, by querying the WCD for a DRC value and decoding the DRC value so obtained, the network device could derive a projected data rate (e.g., bits per second) for providing the requested service on the EVDO interface. The network device could then determine the projected (EVDO) spectral efficiency by dividing the projected data rate by the EVDO channel bandwidth (e.g., 1.25 MHz, as described below).

Similarly to the first average spectral efficiency, the second average spectral efficiency could correspond to a running time average of spectral efficiencies of communications carried on the second air interface between the second RAN and one or more other WCDs served by the second RAN. Again for the example of an EVDO RAN, the network device could determine the data rates of communication services provided by the second (EVDO) RAN over a time window reaching backward from the time at which the WCD request of step 102 was received. More specifically, the network device could query the EVDO RAN for a history of DRC values received from WCDs during the time window. Dividing the data rates corresponding to the historical DRC values by the EVDO channel bandwidth would then give corresponding spectral efficiencies used during the time window. These could be averaged in a manner similar to that described for the first average spectral efficiency, and the second ratio then computed from the projected spectral efficiency and the second average spectral efficiency. Again, the network device could query the second RAN for the projected spectral efficiency, the average spectral efficiency, or both.

In accordance with example embodiments, the first and second RANs could be co-located, or possibly neighboring. Herein, neighboring RANs are taken to be RANs in close enough proximity to be capable or suitable for serving the same WCD at a given location. An example of such a configuration is first and second RANs with one or more overlapping coverage areas (e.g., cells or sectors).

Also in accordance with example embodiments, the network device could be co-located with one or another or both of the first and second RAN. Example configurations illustrating these different possible relative locations of the network device and the first and second RANs are described below.

It will be appreciated that the example embodiment illustrated in FIG. 1 could include alternate and/or additional steps, while still remaining within the scope and spirit of example embodiments herein. Furthermore, unless stated otherwise, conditional operations that can be expressed in a mathematical form such as "if x y, then do a; if x<y, then do b" or the like, can generally be exchanged with alternate forms expressed as "if x>y, then do a; if x<y, then do b," while still achieving the same intended operational principles of the example embodiments.

Figure 2:
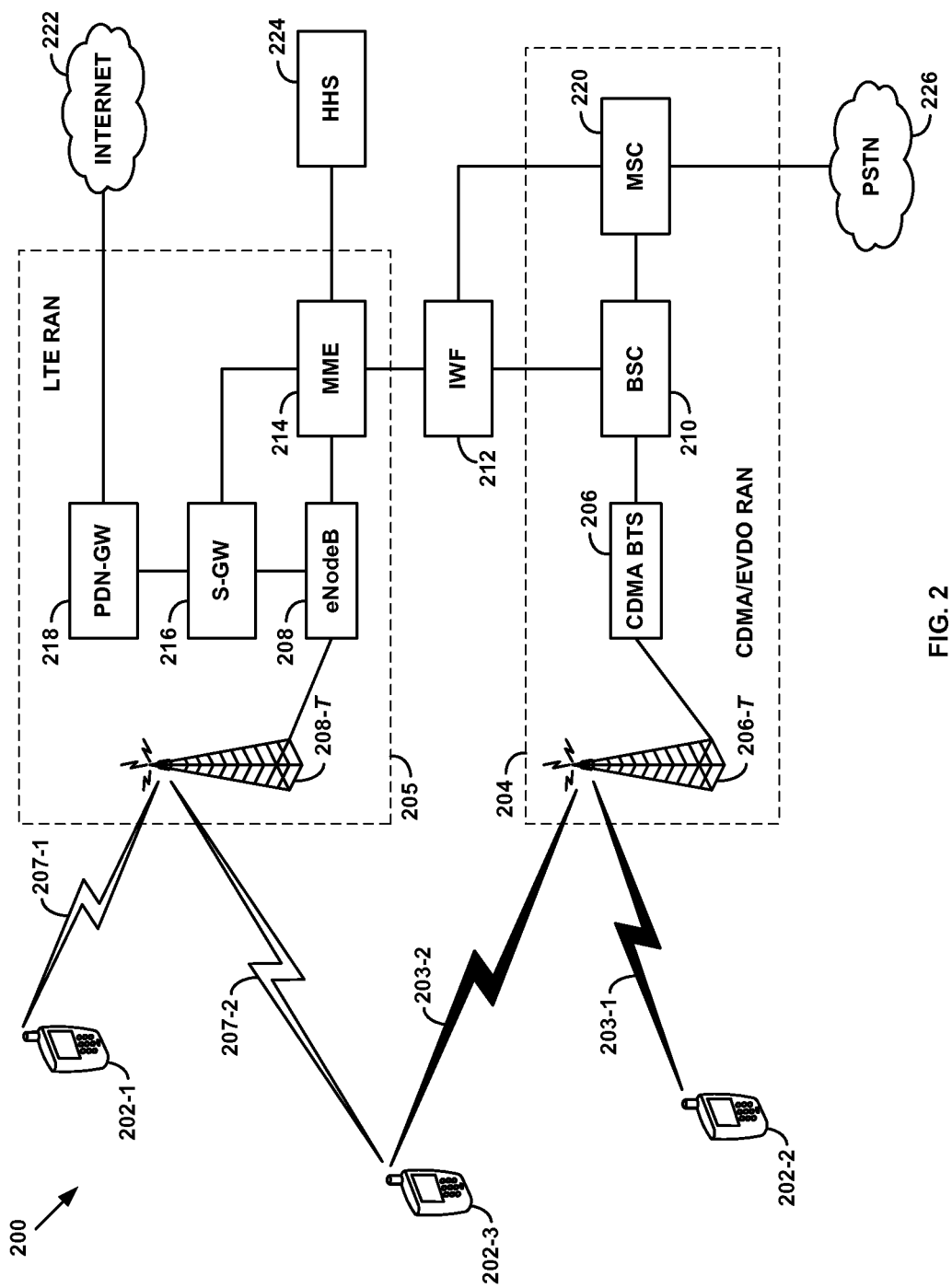
FIG. 2 is a simplified block diagram of two example RANs of an example of wireless communication system in which selection of an air interface protocol based on spectral efficiency could be implemented, in accordance with example embodiments.

FIG. 2 shows a simplified block diagram of an example wireless network 200 that can be operated by a wireless service provider, and in which an example method of selection of an air interface protocol based on spectral efficiency. By way of example, the network 200 includes RAN 204 configured to support both CDMA-based air interface communications (e.g., as specified under both IS-2000 and IS-856), RAN 205 configured to support OFDMA-based air interface communications (e.g., as specified under LTE Advanced). For convenience in discussing the example embodiments presented herein, the term "EVDO RAN" will be used for referring to the RAN 204, and the term "LTE RAN" will be used for referring to the RAN 205. It will be appreciated that a network such as network 300 could include support for other types of air-interface technologies as well.

The EVDO RAN 204 includes a CDMA BTS 206 with a CDMA/EVDO air interface antenna 206-T for providing services according to CDMA/EVDO. The LTE RAN 205 includes an LTE eNodeB 200 with an LTE air interface antenna 208-T for providing services according to LTE.

The example illustrated in FIG. 2 also shows three WCDs 202-1, 202-2, and 202-3, each depicted as having at least one active air interface of a particular type with one or another of the antennas 206-T or 208-T. Specifically, the WCD 202-1 has an air interface 201-1 with the LTE RAN 205 via the eNodeB 208 and the associated antenna 208-T. The WCD 202-2 has an air interface 203-1 also with the EVDO RAN 204 via the BTS 206 and the associated antenna 206-T. The WCD 202-2 has two different air interfaces: an air interface 203-2 with the EVDO RAN 204 via the BTS 206 and the associated antenna 206-T, and an air interface 207-2 with the LTE RAN 205 via the eNodeB 208 and the associated antenna 208-T.

As a visual cue, the LTE air interfaces are depicted as white-filled "lightning bolts," and the EVDO air interfaces are depicted as blackened "lightning bolts." The two air interfaces 207-2 and 203-2 depicted for the WCD 202-3 may be taken as representing a capability of the WCD 202-3 to operate according to either air interface separately, and/or to operate according to both concurrently.

For communications under LTE (or LTE Advanced) based protocols, subscribers may engage in communications via the eNodeB 208 and the associated antenna 208-T from the WCD 202-1 over air interface 207-1 and/or from the WCD 202-3 over air interface 207-2. Transmissions over the air interface 207-1 from the antenna 208-T to the WCD 202-1 represent a "downlink" from the eNodeB 208 to the WCD 202-1, while transmissions over air interface 207-1 from the WCD 202-1 to the antenna 208-T represent an "uplink" from the WCD 202-1. Similarly, transmissions over the air interface 207-2 from the antenna 208-T to the WCD 202-3 represent a downlink from the eNodeB 208 to the WCD 202-3, while transmissions over air interface 207-2 from the WCD 202-3 to the antenna 208-T represent an uplink from the WCD 202-3. Under LTE Advanced, the downlink operates according to OFDMA, while the uplink operates according to Single Carrier Frequency Division Multiple Access (SC-FDMA).

The eNodeB 208 may be connected to a serving gateway S-GW 216, which in turn may be connected to an internet 222 via a packet data network gateway PDN-GW 218. The eNodeB 208 could also be connected to the S-GW 216 by way of a mobility management entity MME 214, which may also be configured to control communications between the eNodeB 208 and one or more other eNodeBs in the network. The MME 214 may also be communicatively coupled to a home subscriber server (HSS) 224, which stores subscriber information, including information about the WCD 202-1 and/or WCD 202-3. For cellular voice communications, the eNodeB may connect to a MSC 220 by way of an inter-working function IWF 212 communicatively connected between the MME 212 and the MSC 220. The MSC 220 may then provide connectivity of a PSTN 226, as shown.

For communications under CDMA based protocols, subscribers may engage in communications via the BTS 206 and the associated antenna 206-T from the WCD 202-2 over air interface 203-1 and/or from the WCD 202-3 over air interface 203-2. Transmissions over the air interface 203-1 from the antenna 206-T to the WCD 302-2 represent a "forward link" from the CDMA/EVDO BTS 206 to the WCD 202-2, while transmissions over air interface 203-1 from the WCD 202-2 to the antenna 206-T represent a "reverse link" from the WCD 202-2. Similarly, transmissions over the air interface 203-2 from the antenna 206-T to the WCD 202-3 represent a forward link, while transmissions over air interface 203-2 from the WCD 202-3 to the 206-T represent a reverse link.

The CDMA BTS 206 may be connected to a BSC 210, which provides a connection to the MSC 220 for cellular voice communications. The MSC 220 acts to control assignment of air traffic channels (e.g., over air interfaces 203-1 and 203-2), and provides access to wireless circuit-switched services such as circuit-voice and circuit-data (e.g., modem-based packet data) service. As represented by its connection to the PSTN 226, the MSC 220 may also be coupled with one or more other MSCs, other telephony circuit switches in the operator's (or in a different operator's) network, or other wireless communication systems, thereby supporting user mobility across MSC regions, roaming between systems, and local and long-distance landline telephone services.

For packet data communications, the IWF 212 connected between the BSC 210 and the MME 214 can support interworking between EVDO based packet protocols and those of the LTE Advanced based network. Thus, the BSC 210 may communicate on the internet 222 by way of the MME 214, the S-GW 216, and the PDN GW 218.

Figure 3:
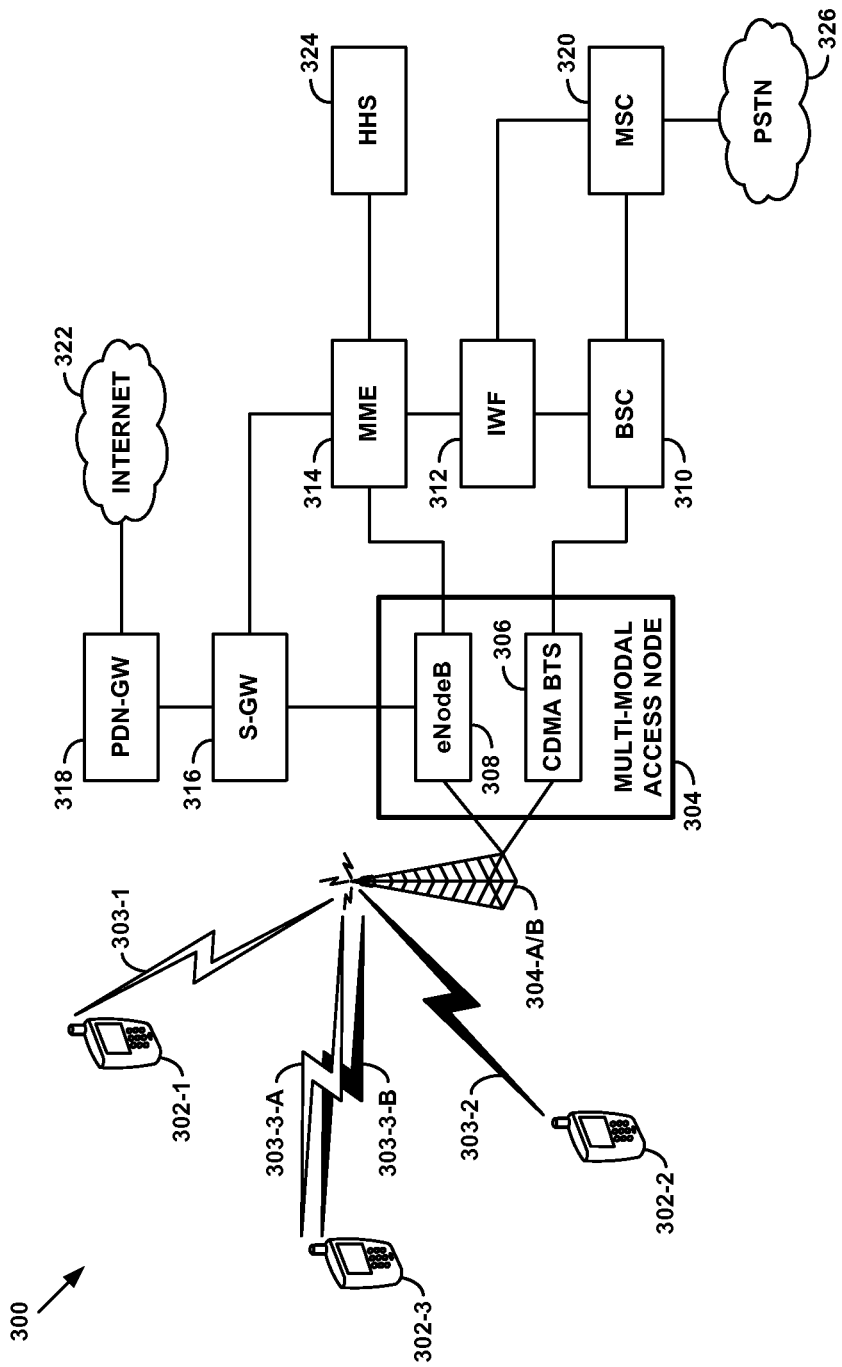
FIG. 3 is a simplified block diagram of an example multi-modal RAN of an example of wireless communication system in which selection of an air interface protocol based on spectral efficiency could be implemented, in accordance with example embodiments.

FIG. 3 is a simplified block diagram of an example of alternate RAN configuration in which a CDMA/EVDO RAN and an LTE RAN are merged into a single "multi-modal" RAN of a network 300. As shown, the multi-modal RAN includes antenna system 304-A/B, where the label "A/B" signifies that the antenna system supports at least two different air-interface technologies arbitrarily labeled "A" for an LTE Advanced based air interface, and "B" for CDMA based air interface. The multi-modal antenna system 304-A/B can be considered antenna and transceiver elements of a multi-modal access node 304, which in turn includes a CDMA/EVDO BTS 406 for CDMA/EVDO based communications and an eNodeB 308 for LTE Advance based communication, each respectively coupled with the multi-modal antenna system 304-A/B.

The example illustrated in FIG. 4 also shows three WCDs 302-1, 302-2, and 302-3. Each WCD is depicted as having at least one active air interface of particular type with the antenna system 304-A/B. Specifically, the WCD 302-1 has an air interface 303-1; the WCD 302-2 has an air interface 303-2; and the WCD 302-3 has two air interfaces 303-3-A and 303-3-B. For purposes of illustration, and by way of example, the air interfaces 303-1 and 303-3-A may be taken to be LTE air interfaces, and the air interfaces 303-2 and 303-3-B may be taken to be CDMA/EVDO air interfaces. As in FIG. 2, the LTE Advanced air interfaces are depicted as white-filled "lightning bolts," and the CDMA air interfaces are depicted as blackened "lightning bolts." The two air interfaces 303-3-A and 303-3-B depicted for the WCD 302-3 may be taken as representing a capability of the WCD 302-3 to operate according to either air interface separately, and/or to operate according to both concurrently.

For communications under LTE Advanced based protocols, subscribers may engage in communications via antenna system 304-A/B from the WCD 302-1 over air interface 303-1 and/or from the WCD 302-3 over air interface 303-3-A. Uplinks and downlinks are defined as in FIG. 2.

The eNodeB 308 may be connected to a serving gateway S-GW 316, which in turn may be connected to an internet 322 via a packet data network gateway PDN-GW 318. The eNodeB 308 could also be connected to the S-GW 316 by way of a mobility management entity MME 314, which may also be configured to control communications between the eNodeB 308 and one or more other eNodeBs in the network. The MME 314 may also be communicatively coupled to a HSS 324, which stores subscriber information, including information about the WCD 302-1 and/or WCD 302-3. For cellular voice communications, the eNodeB may connect to a MSC 320 by way of an interworking function IWF 312 communicatively connected between the MME 312 and the MSC 320. The MSC 320 may then provide connectivity of a PSTN 326, as shown.

For communications under CDMA/EVDO based protocols, subscribers may engage in communications via antenna system 304-A/B from the WCD 302-2 over air interface 303-2 and/or from the WCD 302-3 over air interface 303-3-B. Forward and reverse links are defined as in FIG. 2, except now both CDMA/EVDO forward and reverse links and LTE uplinks and downlinks may share a common antenna system 304-AB in the multi-modal RAN.

The CDMA/EVDO BTS 306 may be connected to a BSC 310, which provides a connection to the MSC 320 for cellular voice communications. The MSC 320 acts to control assignment of air traffic channels (e.g., over air interfaces 303-2 and 303-3-B), and provides access to wireless circuit-switched services such as circuit-voice and circuit-data (e.g., modem-based packet data) service. As represented by its connection to the PSTN 326, the MSC 320 may also be coupled with one or more other MSCs, other telephony circuit switches in the operator's (or in a different operator's) network, or other wireless communication systems, thereby supporting user mobility across MSC regions, roaming between systems, and local and long-distance landline telephone services.

For packet data communications, the IWF 312 connected between the BSC 310 and the MME 314 can support interworking between CDMA/EVDO based packet protocols and those of the LTE Advanced based network. Thus, the BSC 410 may communicate on the internet 322 by way of the MME 314, the S-GW 316, and the PDN GW 318.

It should be understood that the depiction of just one of each network element in each of FIGS. 2 and 3 is illustrative, and there could be more of any of them, as well as other types of elements not shown. The particular arrangements shown in FIGS. 2 and 3 should not be viewed as limiting with respect to the example embodiments presented herein. Further, the network components that make up a wireless communication system such as network 200 or 300 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs (or other forms of computer logic instructions) and related data (e.g., machine-language instructions and program and user data) stored in the one or more forms of computer-readable storage and executable by the one or more computer processors to carry out the functions, steps, and procedures of the various example embodiments described herein. Similarly, a communication device such as example WCDs 202-1, 202-2, and 202-3, and WCDs 302-1, 302-2, and 302-3 typically comprises a user-interface, I/O components, a communication interface, a tone detector, a processing unit, and data storage, all of which may be coupled together by a system bus or other mechanism. As such, networks 200 and 300, WCDs 202-1, 202-2, and 202-3, and WCDs 302-1, 302-2, and 302-3, and air interfaces 203-1, 203-2, 207-1, and 207-2, and 303-1, 303-2, 303-3-A, and 303-3-B collectively are representative of example means of implementing and carrying out the various functions, steps, and procedures described herein.

1. Example Access Technologies a. Conventional CDMA Communications

In a conventional CDMA wireless network compliant with the well known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When a WCD operates in a given sector, communications between the WCD and the BTS of the sector are carried on a given frequency and are encoded by the sector's PN offset and a given Walsh code. The power allocated to each channel is determined so as to optimize the signal to noise characteristics of all the channels, and may vary with time according to the number of WCDs being serviced, and their relative positions with respect to the BTS, among other factors.

Air interface communications are divided into forward link communications, which are those passing from the base station to the WCD, and reverse link communications, which are those passing from the WCD to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels (depending on service demand, for example), and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of WCDs between sectors, under IS-2000 a WCD can communicate on a given carrier frequency with a number of "active" sectors concurrently, which collectively make up the WCD's "active set." Depending on the system, the number of active sectors can be up to six (currently). The WCD receives largely the same signal from each of its active sectors and, on a frame-by-frame basis, selects the best signal to use. A WCD's active set is maintained in the WCD's memory, each active sector being identified according to its PN offset. The WCD continually monitors a pilot signal from each of its active sectors as well as from other sectors, which may vary as the WCD moves about within the wireless communication system, or as other factors cause the WCD's RF conditions to change. More particularly, the WCD monitors a signal-to-noise metric referred to as "signal to interference plus noise ratio" ("SINR"), which includes the degrading effects of interference as well as noise on RF conditions. The WCD reports the received signal strengths to the serving base station, which then directs the WCD to update its active set in accordance with the reported strengths and one or more threshold conditions. Note that a WCD's active set can include a femtocell.

Typically, the power level of the pilot detected by a WCD is specified as a gain level, x, according to the relation x dBm=10 $\log_{10}$(P/1 mW), where P is the power in mW (milliwatts). However, other power units could be specified. Measured in dBm, gain expresses a logarithmic ratio of power P to a fixed power level of 1 mW. More generally, the relative gain, y, of one power level $P_1$ to another $P_2$ is expressed as dB, and corresponds to a logarithmic ratio of $P_1$ to $P_2$ given by y dB=10 $\log_{10}(P_1/P_2)$. For instance, if y=3, then $P_1 \approx 2 \times P_2$; if y=−3, then $P_1 \approx 0.5 \times P_2$. In practice, SINR is measured in dB, where $P_1$ corresponds to the received power of the pilot and $P_2$ corresponds to the received noise plus interference power.

b. High Rate Packet-Data TDM Communications

Under IS-2000, the highest rate of packet-data communications theoretically available on a fundamental traffic channel of the forward link is 9.6 kbps, dependent in part on the power allocated to the forward-link traffic channel and the resultant signal to noise characteristics. In order to provide higher rate packet-data service to support higher bandwidth applications, the industry introduced a new "high rate packet data (HRPD) system," which is defined by industry standard IS-856 (or EVDO).

IS-856 leverages the asymmetric characteristics of most IP traffic, in which the forward link typically carries a higher load than the reverse link. Under IS-856, each WCD maintains and manages an active set as described above, but receives forward-link transmission from only one active sector at a time. In turn, each sector transmits to all its active WCDs on a common forward link using time division multiplexing (TDM), in order to transmit to only one WCD at a time, but at the full power of the sector. As a result of the full-power allocation by the sector, a WCD operating under IS-856 can, in theory, receive packet-data at a rate of at least 38.4 kbps and up to 2.4 Mbps. The reverse link under IS-856 retains largely the traditional IS-2000 code division multiplexing (CDM) format, albeit with the addition of a data rate control (DRC) channel used by the WCD to indicate the supportable data rate and best serving sector for the forward link. More specifically, the WCD monitors SINR on the forward link from its serving sector (or base station) to determine a data rate to request. The requested data rate is encoded in a DRC request, and transmitted to the serving base station on the DRC channel, which is a sub-channel of a reverse-link Medium Access Control (MAC) channel.

TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a forward-link MAC channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. As in IS-2000, each sector in IS-856 is defined by a PN offset, and the pilot channel carries an indication of the sector's PN offset. Again, a sector could correspond to a femtocell.

c. LTE Advanced Communications

Under LTE Advanced, the downlink comprises multiple frequency carrier bands arranged to cover a total bandwidth of up to 20 MHz (currently) in frequency space. Each frequency carrier band is divided into 12 orthogonal sub-carrier frequencies, each 15 kHz in width, for a total of 180 kHz per frequency carrier band. The number of frequency carrier bands corresponds to the integer division of the total bandwidth by 180 kHz. For example, a total bandwidth of 1.25 MHz supports six frequency carrier bands; a total bandwidth of 20 MHz supports 100 frequency carrier bands. The orthogonality of the subcarrier frequencies follows from each being an integer multiple of the same minimum frequency; e.g., 15 kHz. It will be appreciated that a different minimum frequency could be used, as long as the orthogonality condition is met. Similarly, a different number of subcarrier frequencies per frequency carrier band could be used, which could then lead to a different number frequency carrier bands for a given total bandwidth.

In the time domain, the downlink comprises time slots, each typically of 0.5 msec duration. Every two time slots makes up one "sub-frame" of 1.0 msec duration, and every 10 sub-frames makes up a 10 msec frame. Each time slot is subdivided into an integer number of symbol durations, such that the integer number multiplied by the symbol duration equals 0.5 msec. According to current standards, the integer number is either 6 or 7; the value used depends on operating conditions, among other possible factors. For the purposes of the present discussion the integer number of symbol durations per time slot will be taken to be 7, with the understanding that other values could be used.

Transmissions on the downlink are scheduled in time-frequency units referred to as "resource blocks" or RBs. Each RB is made up of 7 contiguous symbol durations (i.e., one time slot) and 12 subcarrier frequencies of a given frequency carrier band. Thus, an RB can be viewed a grid of 7 symbol durations by 12 subcarrier frequencies. Each element of the grid is referred to as "resource element," and each resource element carries one OFDM symbol. Each OFDM symbol of a resource element is a time domain symbol generated from Fourier superposition frequency domain symbols.

A single RB is the smallest unit of allocation made for a given WCD for downlink transmissions. Allocations are typically made by an eNodeB serving the WCD, and more than one RB can be allocated for the WCD. Multiple RB allocations for a given WCD can be made across multiple frequency carrier bands, across multiple time slots, or both, depending on factors including the amount of data to be transmitted to the WCD, the type of data (e.g., best-effort, real-time, etc.), and downlink resources needed for other WCDs.

In addition to carrying OFDM symbols specific to a given WCD, particular resource elements of a given RB are allocated as "reference signals," and may be used to carry pilot signals from the eNodeB. Upon detection of a pilot signal in one or more resource elements of an RB, a WCD may determine SINR of the eNodeB (or more generally, the LTE Advanced base station) that made the RB-based transmission. The WCD may then use the SINR (or other SNR measure) of different eNodeBs that it detects to determine if and when to hand off from one to another, for example.

2. Spectral Efficiency as a Basis for Selecting and Air Interface Protocol

When a WCD sends a request to an LTE RAN (or LTE eNodeB) for data service, it can include in the request an indicator of quality of at least one channel as observed by the WCD based on signal-to-noise ratio or SINR, for example. The indicator, referred to as a "channel quality indicator" (CQI), may be used by the LTE RAN to determine a coding modulation scheme and data rate to use for the requested data service with the WCD. If the LTE RAN is co-located with an EVDO RAN—for example, if the LTE eNodeB is co-located with an EVDO BTS—or if the WCD is sufficiently within range of both the LTE RAN and the EVDO RAN, the LTE RAN will conventionally grant the data service request without necessarily determining if the EVDO RAN might be a suitable choice for providing the service. This conventional operation accounts for the typically higher data rates supported by LTE compared with EVDO.

However, it can happen that the spectral efficiency (bits per second per Hz) for providing the service is relatively low on the LTE interface compared with an average spectral efficiency on the LTE interface, and that the spectral efficiency for providing the service is relatively of the EVDO interface that EVDO service is at the same time relatively high. For example, the LTE eNodeB may be highly loaded (in terms of a number of WCDs being concurrently served) and/or the WCD might measure a low SNR, resulting in a relatively lower spectral efficiency for LTE service, even at a data rate commensurate with that projected for EVDO service. At the same time, if the EVDO base station is lightly loaded (in terms of a number of WCDs being concurrently served) and/or the WCD measures a high SINR, the data rate available for providing the service on the EVDO interface at the time of the request might correspond to a high spectral efficiency for EVDO service. Under circumstances such as these, an aggregate spectral efficiency of the LTE RAN and the EVDO RAN might be increased (or at least more advantageously managed) by granting the WCD's service request using the EVDO air interface.

In accordance with example embodiments, a determination as to which of an LTE air interface and an EVDO air interface to select for providing a requested data service to a WCD, when both air interfaces are available, may be made by evaluating the relative spectral efficiencies of the two air interfaces for providing the requested service. More particularly, when a WCD sends a request for data service to an LTE eNodeB, the LTE RAN or other network element can determine a requested spectral efficiency associated with the request. If the requested spectral efficiency exceeds reference level, then the requested service will be provided by the LTE RAN (i.e., the LTE eNodeB that received the request). If the requested spectral efficiency does not exceed the reference level, the LTE RAN or other network element) can determine a projected spectral efficiency for providing the service by the EVDO RAN, and then, in a manner described below, can compare the requested spectral efficiency on the LTE air interface with the projected spectral efficiency on the EVDO interface to determine which of the LTE RAN or the EVDO RAN to select for providing the service.

In accordance with example embodiments, the CQI sent by a WCD in its request to an LTE eNodeB can be used to determine a requested spectral efficiency $\eta_{LTE}$ associated with providing the requested service. Specifically, the WCD includes the CQI encoded as a 4-bit integer, referred to a "CQI index" that can be used in a CQI look-up table to determine an LTE spectral efficiency (as well as the modulation scheme and data rate).

Upon receiving a data service request from a WCD on its LTE air interface, an LTE eNodeB can send the included CQI index to a network device communicatively coupled with both the LTE eNodeB and the EVDO BTS (or base station). By way of example, the network device could be part of the LTE eNodeB, another element of the LTE RAN, or a network node of the wireless communication system. The network device could use the CQI index to determine a requested spectral efficiency associated with the WCD's service request. For example, the network device could look up the requested spectral efficiency $\eta_{LTE}$ in a CQI table. Alternatively, the eNodeB could determine the requested spectral efficiency and send it to the network device.

FIG. 4 is an example CQI table 400 that could be stored in non-transient media in or associated with the network device. As shown, the CQI table 400 includes four columns: CQI Index, Modulation, Code Rate, and Spectral Efficiency (bits/Hz). The CQI index is a four bit integer in the inclusive range of [1, 15]. This is included by a WCD in its request for data service to an LTE eNodeB. For purposes of the present discussion, it may be seen that each CQI index value is associated with a spectral efficiency in the fourth column. Note that as defined in the CQI table 400, spectral efficiency is corresponds to bits per Hz, and can be greater than one. In accordance with example embodiments, the network device can determine the requested spectral efficiency for a WCD data service request by looking up a value in the fourth column of the CQI table 400 (or the like) based on the CQI index received from the WCD by way of the LTE eNodeB.

As described, $\eta_{LTE}$ is based on a SNR or SINR measurement by the WCD at the time it makes its request for service. Thus, it may be considered as reflecting current conditions in the cell or sector of the LTE eNodeB. In accordance with example embodiments, the network device can also determine an average spectral efficiency $<\eta_{LTE}>$ of data communication services provided by the LTE eNodeB over some specified time window. For example, the time window could stretch backward for 10-20 minutes from the time of the WCD's request. Other time durations could be used as well. The network device could obtain a historical record of CQI indexes received in data service requests from WCDs during the time window, and convert the CQI indexes to corresponding historical spectral efficiencies using the CQI table 400, for example. An average spectral efficiency $\langle\eta_{LTE}\rangle$ could then be determined as time average of the historical spectral efficiencies. The time average could be a simple average of the historical spectral efficiencies, or a weighted average in which each historical spectral efficiency is weighted by a duration of how long the spectral efficiency was applied in the associated data communication service. Other particular formulas for deriving average spectral efficiency could be devised as well.

In further accordance with example embodiments, the network device could compute a first ratio of the requested spectral efficiency to the average spectral efficiency, $$R_1 = \frac{\eta_{LTE}}{\langle\eta_{LTE}\rangle},$$

and compare the ratio to a threshold value. If the ratio is greater than or equal to a threshold value, $R_1 \geq$ Threshold, then the network device could select the LTE eNodeB to provide the requested service on the LTE air interface. If the ratio is less than the threshold value, $R_1 <$ Threshold, then the network device could determine a projected spectral efficiency for providing the requested service on the EVDO air interface of the EVDO RAN (e.g., EVDO BTS), and could further determine an average spectral efficiency of service provided on the EVDO air interface. The network device could then compute and compare a ratio of the requested-to-projected spectral efficiencies to a ratio of the LTE average spectral efficiency to the EVDO average spectral efficiency in order to determine which air interface to select for granting the WCD's requested service, as described below.

In accordance with example embodiments, the network device could determine the projected spectral efficiency $\eta_{DO}$ by first determining a projected data rate for providing the data service on the EVDO interface, and dividing the result by the channel bandwidth (e.g., 1.25 MHz for EVDO). The projected data rate could be determined by querying the WCD for a DRC value that the WCD would use if it were to request the data service from the EVDO RAN instead. The request could be made via the LTE eNodeB, for example. Upon receiving the DRC, the network device could then determine a corresponding data rate by decoding the DRC value. For example, the network device could look up the data rate in a DRC table using the DRC value from the WCD.

FIG. 5 is an example DRC table 500 that could be stored in non-transient media in or associated with the network device, and used for looking up a projected data rate based on a DRC value reported by a WCD. The same or similar table may be stored in the WCD and consulted when the WCD makes a data service request. As shown, the DRC table 500 has four columns: column 502 lists SINR threshold values in dB in increasing order; column 504 lists the corresponding DRC codes; column 506 lists the corresponding numerical data rates; and column 508 lists number of timeslots required for transmitting a packet at the corresponding data rate and DRC code. The SINR thresholds in column 502 are applied by the WCD as upper limits, such that the WCD determines the smallest SINR threshold value that is greater than (but not equal to) a given SINR measured by the WCD, and selects the preconfigured DRC code corresponding with the determined largest SINR threshold value. For example, for a measured SINR of −3.2 dB, the WCD would determine the smallest SINR threshold value larger than the measured one to be −2.8 dB, corresponding to a DRC code of 3 and a forward-link data rate of 153.6 kbps.

Were the WCD making a data service request, it would then send the DRC code in the request to the EVDO base station. In the currently described example embodiment, the WCD will just report the DRC code to the LTE eNodeB, which will then send the code to the network device. The network device can then use the reported DRC code to look up the corresponding projected data rate in the third column 506 of the DRC table 500. Dividing the projected data rate by the channel bandwidth would then give the project spectral efficiency $f_{DO}$.

In further accordance with example embodiments, the network device could determine an average EVDO spectral efficiency $\langle\eta_{DO}\rangle$ in a manner similar that for determining $\langle f_{LTE}\rangle$. Specificlly, the network device query the EVDO BTS (or other element of the EVDO RAN) to obtain DRC values used for servicing data requests over a time window stretching back from the current time (e.g., the time that the WCD's request to the LTE eNodeB was received). The time window could be the same as that used for computing the average LTE spectral efficiency, for example. The historical DRC values could be used to determine historical data rates and corresponding historical EVDO spectral efficiencies. An average EVDO spectral efficiency $\langle f_{DO}\rangle$ could then be determined in a manner similar to that described above data service for the average LTE spectral efficiency.

The network device could then compute a current spectral efficiency ratio as a ratio of the projected EVDO spectral efficiency to the requested LTE spectral efficiency, $$R_{cur} = \frac{\eta_{DO}}{\eta_{LTE}}.$$

Similarly, the network device could compute a ratio of the average EVDO spectral efficiency to the average LTE spectral efficiency, $$R_{avg} = \frac{\langle\eta_{DO}\rangle}{\langle\eta_{LTE}\rangle}.$$

If the current spectral efficiency ratio is less than or equal the average spectral efficiency ratio, $R_{cur} \leq R_{avg}$, then the network device could select the LTE eNodeB to provide the requested service on the LTE air interface. If instead, the current spectral efficiency ratio is greater than the average spectral efficiency ratio, $R_{cur} > R_{avg}$, then the network device could select the EVDO base station (BTS) to provide the requested service on the EVDO air interface.

Selection of which air interface to use based on the spectral efficiencies, as just described for example, can help balance the generally higher data rates supported under LTE against a distribution of provided data services between LTE and EVDO in a way that enhances an aggregate or overall spectral efficiency of providing data services over both air interface technologies. This can be seen by considering the algebraic inequalities used in comparing the spectral efficiency ratios above. Specifically, the inequality $R_{cur} < R_{avg}$ can be algebraically rearranged as $$\frac{\eta_{LTE}}{\langle \eta_{LTE} \rangle} \geq \frac{\eta_{DO}}{\langle \eta_{DO} \rangle}.$$

Defining the ratio $$R_2 = \frac{\eta_{DO}}{\langle \eta_{DO} \rangle}$$

and taking $$R_1 = \frac{\eta_{LTE}}{\langle \eta_{LTE} \rangle}$$

as defined above, the inequality $$\frac{\eta_{LTE}}{\langle \eta_{LTE} \rangle} \geq \frac{\eta_{DO}}{\langle \eta_{DO} \rangle}$$

becomes $R_1 \geq R_2$. The selection of the air interface based on spectral efficiencies can then be summarized as:
  If $$R_1 = \frac{\eta_{LTE}}{\langle \eta_{LTE} \rangle}$$

≥Threshold, then select the LTE air interface. (1)
  If Threshold>

$$\frac{\eta_{LTE}}{\langle \eta_{LTE} \rangle} \geq \frac{\eta_{DO}}{\langle \eta_{DO} \rangle} = R_2,$$

then select the LTE air interface. (2)
  If Threshold>

$$\frac{\eta_{LTE}}{\langle \eta_{LTE} \rangle} \text{ and } \frac{\eta_{DO}}{\langle \eta_{DO} \rangle} > \frac{\eta_{LTE}}{\langle \eta_{LTE} \rangle},$$

men select the EVDO air interface. (3)

Condition (1) corresponds to a requested (current) LTE spectral efficiency that is sufficiently high compared with the average LTE spectral efficiency as to make selection of the LTE air interface a good choice. For example, if threshold is greater than one (Threshold>1), the condition (1) indicates that $\eta_{LTE} \geq \langle \eta_{LTE} \rangle$, so providing the requested data service on the LTE air interface will tend to increase the average LTE spectral efficiency of the LTE eNodeB. The threshold need not be greater than one, as discussed in the numerical example below.

Condition (2) indicates that while the requested (current) LTE spectral efficiency is not higher than a threshold level compared with the average LTE spectral efficiency, it is nevertheless proportionally higher than the projected EVDO spectral efficiency. The proportionality is contained in the ratios $R_1$ and $R_2$. Thus, providing the requested data service on the LTE air interface is still preferable to providing the requested service on the EVDO air interface.

Condition (3) indicates that the requested (current) LTE spectral efficiency is not only below the threshold level compared with the average LTE spectral efficiency, but it is also proportionally lower than the projected EVDO spectral efficiency. Again, the proportionality is contained in the ratios $R_1$ and $R_2$. Thus, providing the requested data service on the EVDO air interface may tend to increase an aggregate or overall spectral efficiency of both the LTE and EVDO air interfaces.

The following numerical example further illustrates how selection of an air interface based on spectral efficiency may operate in example practical circumstances. For the numerical example, it is assumed that an "expected average LTE spectral efficiency," $E[\langle \eta_{LTE} \rangle]$, may be determined for the LTE air interface. For example, $E[\langle \eta_{LTE} \rangle]$ could be an average over multiple LTE air interfaces of a wireless communication system, and/or could correspond to a longer-term average than the average LTE spectral efficiency $\langle \eta_{LTE} \rangle$, such as an average over many hours, days, or even longer. It could also be based on time of day, such as a busy-time average and/or quiet-time average. In contrast, $\langle \eta_{LTE} \rangle$ can be taken to apply to a particular LTE air interface at which a service request is received, and/or might correspond to a rolling time average over a shorter time window, such as minutes or tens of minutes, for example. In a similar way, it is assumed that an analogous "expected average EVDO spectral efficiency," $E[\langle \eta_{DO} \rangle]$, may be determined for the EVDO air interface.

In accordance with example embodiments, the threshold value can be set with reference to $E[\langle \eta_{LTE} \rangle]$ and $E[\langle \eta_{DO} \rangle]$ by considering a sort of "target" case in which $\langle \eta_{LTE} \rangle \approx E[\langle \eta_{LTE} \rangle]$ and $\langle \eta_{DO} \rangle \approx E[\langle \eta_{DO} \rangle]$, and stipulating that the requested spectral efficiency $\eta_{LTE}$ be at least as high as $E[\langle \eta_{DO} \rangle]$ in order to sufficiently warrant selection of the LTE air interface. A sufficient condition for selecting the LTE air interface can then be expressed as $\eta_{LTE} \geq E[\langle \eta_{DO} \rangle]$. Dividing both sides of this expression by $E[\langle \eta_{LTE} \rangle]$ gives $$\frac{\eta_{LTE}}{E[\langle \eta_{LTE} \rangle]} \geq \frac{E[\langle \eta_{DO} \rangle]}{E[\langle \eta_{LTE} \rangle]}.$$

Finally, since $E[\langle \eta_{LTE} \rangle] \approx \langle \eta_{LTE} \rangle$, this can be written as $$R_1 \gtrsim \frac{E[\langle \eta_{DO} \rangle]}{E[\langle \eta_{LTE} \rangle]},$$

winch essentially the same as condition (1), expect for the approximate instead of strict equality. This reasoning therefore suggests using threshold value of Threshold=

$$\frac{E[\langle \eta_{DO} \rangle]}{E[\langle \eta_{LTE} \rangle]}.$$

For purposes of the present illustration, and by way of example, let $E[\langle \eta_{LTE} \rangle] = 2.29$ and let $E[\langle \eta_{DO} \rangle] = 0.66$. These values may be representative of typical system performance, although it will be appreciated that other values could be used. They also fall approximately midrange in the CQI table 400 and the DRC table 500, respectively. Based on these example values, it follows that Threshold=0.288 in conditions (1)-(3) above. In particular, condition (1) corresponds to selection of the LTE air interface if $R_1 \geq 0.288$, or $<\eta_{LTE} \geq 0.66$ (by design in this example). Referring again to the CQI table 400 in FIG. 4, this would be the case for CQI indexes≥5. For $R_1 < 0.228$, conditions on the EVDO air interface need to be evaluated to determine which of conditions (2) or (3) then applies.

Specifically, if $$0.288 > R_1 \geq \frac{\eta_{DO}}{\langle \eta_{DO} \rangle}$$

(condition (2)), then the LTE air interface is still selected. If instead $$R_1 < \frac{\eta_{DO}}{\langle \eta_{DO} \rangle}$$

condition (3)), then the EVDO air interface is selected. As noted above, one rationale for condition (3) is that in this case $\eta_{LTE}$ is a smaller fraction of $<\eta_{LTE}>$ than $\eta_{DO}$ is of $<\eta_{DO}>$, suggesting that service on the EVDO air interface may more favorably contribute to overall spectral efficiency than service on the LTE air interface. A refinement of this rationale can be to set a limit to how small $$R_2 = \frac{\eta_{DO}}{\langle \eta_{DO} \rangle}$$

can be, even when $R_1 < R_2$, in order to warrant selection of the EVDO air interface. This can be accomplished by introducing an additional threshold, $T_{DO}$, for setting a lower limit to $R_2$ and modifying condition (3) as follows.

If Threshold>

$$\frac{\eta_{LTE}}{\langle \eta_{LTE} \rangle} \text{and} \frac{\eta_{DO}}{\langle \eta_{DO} \rangle} > \frac{\eta_{LTE}}{\langle \eta_{LTE} \rangle} \text{and} \frac{\eta_{DO}}{\langle \eta_{DO} \rangle} \geq T_{DO},$$

then select the EVDO air interface. (3a)

If Threshold>

$$\frac{\eta_{LTE}}{\langle \eta_{LTE} \rangle} \text{and} \frac{\eta_{DO}}{\langle \eta_{DO} \rangle} > \frac{\eta_{LTE}}{\langle \eta_{LTE} \rangle} \text{and} \frac{\eta_{DO}}{\langle \eta_{DO} \rangle} < T_{DO},$$

then select the LTE air interface. (3b)

Application of conditions (3a) and (3b) can be illustrated with a numerical example. Specifically, let $T_{DO}=0.66$. Again taking $$<\eta_{DO}> \approx E[\langle \eta_{DO} \rangle] = 0.66, \text{then} \frac{\eta_{DO}}{\langle \eta_{DO} \rangle} \geq T_{DO}$$

corresponds to $\eta_{DO} \geq 0.66 \times 0.66 = 0.436$. Referring again to the DRC table 500 in FIG. 5, condition (3a) can be seen to correspond to DRC code values≥6, while condition (3b) corresponds to DRC code values≤5.

It will be appreciated that the numerical examples above could be adapted to other values of Threshold and (if applicable) $T_{DO}$.

a. Example Method Implementation

Figure 6:
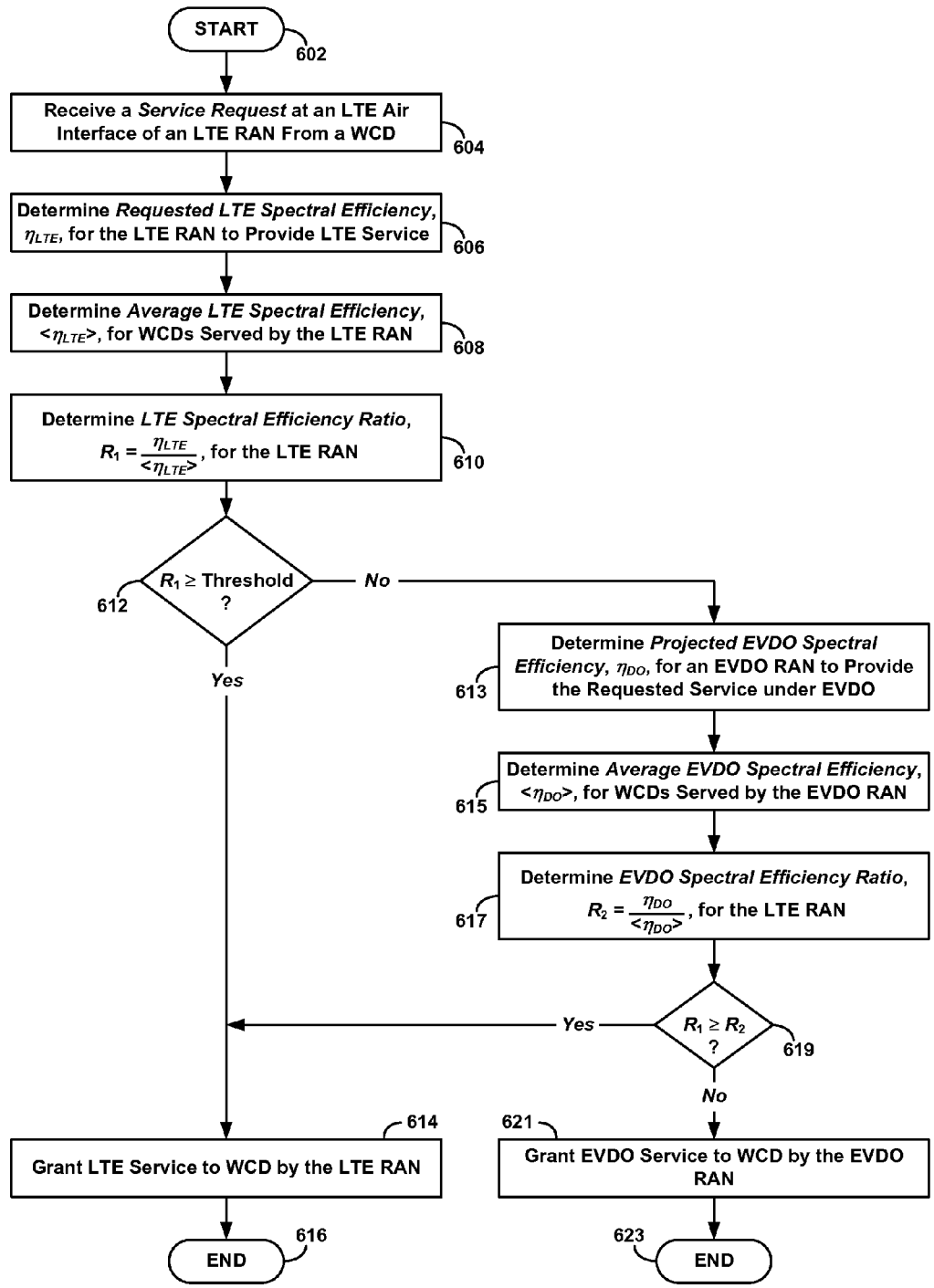
FIG. 6 is a flowchart depicting an example program logic of an example of method selection of an air interface protocol based on spectral efficiency, in accordance with example embodiments.

Selection of an air interface based on spectral efficiency can be implemented as logical instructions that can stored in non-transient media of a network device, and executed by one or processors of the network device. FIG. 6 is a flowchart depicting an example program logic of an example implementation of a method of selection of an air interface protocol based on spectral efficiency, in accordance with example embodiments. The flowchart begins at step 602, which marks the start of the procedure.

At step 602 a service request from a WCD is received at an LTE air interface of an LTE RAN. For example, the request could be received at an LTE air interface of an LTE eNodeB.

At step 606, a requested LTE spectral efficiency $\eta_{LTE}$ for providing the service on the LTE air interface is determined.

At step 608, an average LTE spectral efficiency $<\eta_{LTE}>$ for WCDs being served by the LTE RAN is determined.

At step 610, a LTE spectral efficiency ratio $$R_1 = \frac{\eta_{LTE}}{\langle \eta_{LTE} \rangle}$$

is determined, and at step 612, the determined $R_1$ is compared with a threshold.

If the determination at step 612 is that $R_1 \geq$threshold ("Yes" branch from step 612), then at step 614 requested service is granted on the LTE air interface of the LTE RAN. The procedure then ends at step 616.

If the determination at step 612 is that $R_1 <$threshold ("No" branch from step 612), then the procedure advances to step 613, where a projected EVDO spectral efficiency $\eta_{DO}$ for providing the service on an EVDO air interface is determined. The EVDO RAN could be co-located with the LTE RAN, or could be neighboring such that it is capable of providing the WCD's requested service.

At step 615, an average EVDO spectral efficiency $<\eta_{DO}>$ for WCDs being served by the EVDO RAN is determined.

At step 617, an EVDO spectral efficiency ratio $$R_2 = \frac{\eta_{DO}}{\langle \eta_{DO} \rangle}$$

is determined, and at step 619, the determined $R_2$ is compared with $R_1$.

If the determination at step 619 is that $R_1 \geq R_2$ ("Yes" branch from step 619), then the procedure advances to step 614, where, again, the requested service is granted on the LTE air interface of the LTE RAN. The procedure then ends at step 616.

Figure 7:
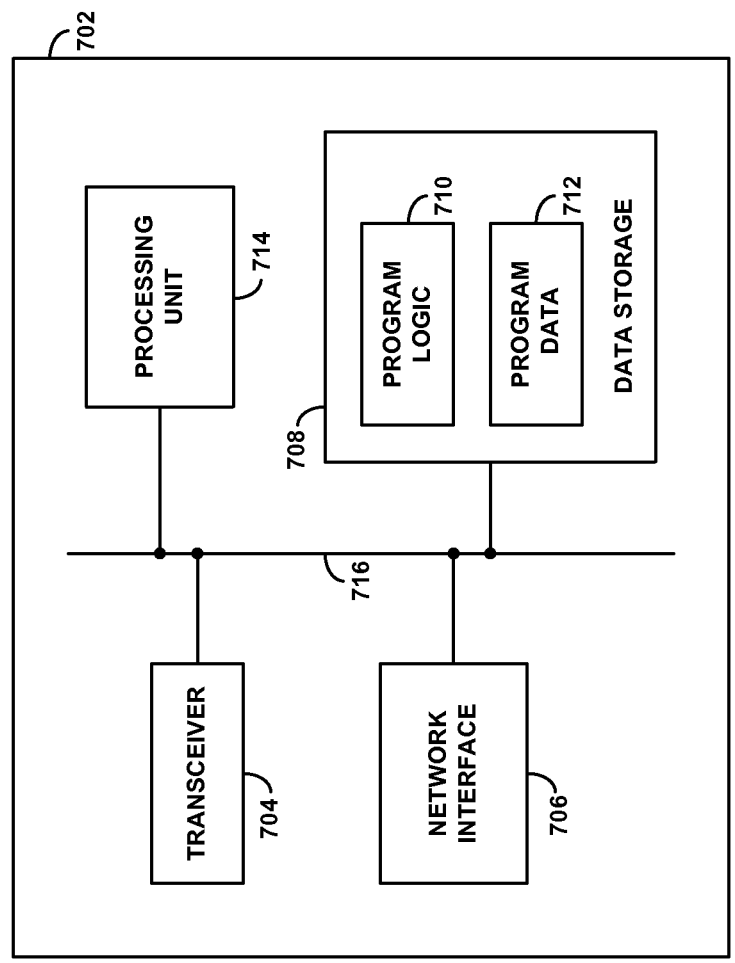
FIG. 7 is a simplified block diagram of an example network device configured for carrying out selection of an air interface protocol based on spectral efficiency, in accordance with example embodiments.

If the determination at step 619 is that $R_1 < R_2$ ("No" branch from step 619), then the procedure advances to step 621, where the requested service is granted on the EVDO air interface of the EVDO RAN. The procedure then ends at step 623.

b. Example network device FIG. 7 is a simplified block diagram depicting functional components of an example network device 702 in which an example embodiment of selection of an air interface protocol based on spectral efficiency could be carried implemented. As shown in FIG. 7, the example network device 702 includes a transceiver 704, network interface 706, a processing unit 714, and data storage 708, all of which may be coupled together by a system bus 716 or other mechanism. In addition, the network device 702 may also include external storage, such as magnetic or optical disk storage, although this is not shown in FIG. 7. By way of example, the network device could be an IWF (such as IWF 212 in FIG. 2 or IWF 312 in FIG. 3), an MME (such as MME 214 in FIG. 2 or MME 314 in FIG. 3), or an eNodeB (such as eNodeB 208 in FIG. 2 or eNodeB 308 in FIG. 3).

These components may be arranged to support wireless communications in a wireless communication network that is compliant with a variety of wireless air-interface protocols, such as networks 200 and/or 300 illustrated in FIGS. 2 and 3, respectively. In particular, these components can support selection of an air interface protocol based on spectral efficiency, in accordance with example embodiments.

Network interface 706 enables communication on a network, such networks 200 or 300. As such, network interface 706 may take the form of an Ethernet network interface card or other physical interface to a broadband connection to the internet or some other data network. Further, a network device implemented as part of an eNodeB, for example, may also include a transceiver 704, which may include one or more antennas, enables air interface communication with one or more WCDs, supporting both downlink and uplink transmissions.

Processing unit 714 comprises one or more general-purpose processors (e.g., INTEL microprocessors) and/or one or more special-purpose processors (e.g., dedicated digital signal processor, application specific integrated circuit, etc.). In turn, the data storage 708 comprises one or more volatile and/or non-volatile storage components, such as magnetic or optical memory or disk storage. Data storage 708 can be integrated in whole or in part with processing unit 714, as cache memory or registers for instance. As further shown, data storage 708 is equipped to hold program logic 710 and program data 712.

Program data 712 may comprise data such as a CQI table and/or a DRC table, as well as a threshold. Program logic 710 may comprise machine language instructions that define routines executable by processing unit 714 to carry out various functions described herein. In particular the program logic, communication interface, and transceiver may operate cooperatively to carry out logical operation, such as that described by way of example in FIG. 6, as well other functions discussed above.

It will be appreciated that there can be numerous specific implementations of a network device, such as network device 702, in which selection of an air interface protocol based on spectral efficiency could be implemented. Further, one of skill in the art would understand how to devise and build such an implementation. As such, network device 702 is representative of means for carrying out selection of an air interface protocol based on spectral efficiency, in accordance with the methods and steps described herein by way of example.

4. Conclusion

An example embodiment has been described above. Those skilled in the art will understand, however, that changes and modifications may be made to this embodiment without departing from the true scope and spirit, which is defined by the claims.

We claim:

1. In a wireless communication system comprising a first radio access network (RAN) configured to serve wireless communication devices (WCDs) on a first air interface according to a first air interface protocol, a second RAN configured to serve WCDs on a second air interface according to a second air interface protocol, and a network device communicatively connected to both the first and second RANs, a method comprising:
    at the first RAN, receiving a wireless transmission on the first air interface from a WCD including a message requesting a wireless service from the first RAN, the message including information indicative of a requested spectral efficiency for the requested wireless service, wherein the spectral efficiency corresponds to a metric of bit rate per utilized bandwidth;
    at the network device, receiving the information indicative of the requested spectral efficiency;
    based on the information, determining by the network device the requested spectral efficiency for providing the requested wireless service on the first air interface of the first RAN according to the first air interface protocol;
    at the network device, making a comparison of the requested spectral efficiency with at least one of (a) a threshold, or (b) a projected spectral efficiency for providing the requested wireless service on the second air interface of the second RAN according to the second air interface protocol; and
    based on the comparison, providing the WCD the requested wireless service on one of (i) the first air interface of the first RAN according to the first air interface protocol, or (ii) the second air interface of the second RAN according to the second air interface protocol; wherein the requested wireless service comprises a wireless communication service.

2. The method of claim 1, wherein receiving information comprises receiving the information from the first RAN upon the first RAN receiving the message from the WCD requesting the wireless service.

3. The method of claim 2, wherein the first RAN includes a base station having an air interface configured to operate according to the first air interface protocol,
    wherein the network device is at least one of co-located with the first RAN or co-located with the base station, and wherein the first RAN receiving the message from the WCD requesting the wireless service comprises the base station receiving the the message from the WCD on the air interface.

4. The method of claim 1, wherein the information includes a channel quality indicator (CQI) index, and wherein determining the requested spectral efficiency for providing the requested wireless service on the first air interface of the first RAN comprises looking up a spectral efficiency in a CQI table based on the CQI index.

5. The method of claim 1, wherein, based on the comparison, providing the WCD the requested wireless service on one of (i) the first air interface of the first RAN according to the first air interface protocol, or (ii) the second air interface of the second RAN according to the second air interface protocol comprises:
    determining a first ratio of the requested spectral efficiency to a first average spectral efficiency measured on the first air interface of the first RAN;
    if the determined first ratio is greater than or equal to the threshold, then providing the WCD the requested wireless service on the first air interface of the first RAN according to the first air interface protocol;
    if the determined first ratio is less than the threshold, then determining a second ratio of the projected spectral efficiency to a second average spectral efficiency measured on the second air interface of the second RAN;

if the determined first ratio is less than the threshold and the determined first ratio is also greater than or equal to the determined second ratio, then providing the WCD the requested wireless service on the first air interface of the first RAN according to the first air interface protocol; and if the determined first ratio is less than the threshold and the determined first ratio is also less than the determined second ratio, then providing the WCD the requested wireless service on the second air interface of the second RAN according to the second air interface protocol.

6. The method of claim 5, wherein determining the first ratio comprises determining the first average spectral efficiency as a running time average of spectral efficiencies of communications carried on the first air interface between the first RAN and one or more WCDs served by the first RAN.

7. The method of claim 5, wherein determining the second ratio comprises:

determining the projected spectral efficiency for providing the requested wireless service on the second air interface of the second RAN; and determining the second average spectral efficiency as a running time average of spectral efficiencies of communications carried on the second air interface between the second RAN and one or more WCDs served by the second RAN.

8. The method of claim 7, wherein determining the projected spectral efficiency for providing the requested wireless service on the second air interface of the second RAN comprises:

determining a projected data rate supported on the second air interface of the second RAN between the second RAN and the WCD; and dividing the determined projected data rate by a bandwidth used for carrying communications on the second air interface of the second RAN between the second RAN and WCDs served by the second RAN.

9. The method of claim 1, wherein the first air interface protocol is Long Term Evolution (LTE), and the first air interface operates according to LTE specifications, and wherein the second air interface protocol is selected from the group consisting of Evolution-Data Optimized (EVDO) and Universal Mobile Telecommunications System (UMTS), and the second air interface operates according to one of EVDO specifications or UMTS specification.

10. The method of claim 1, wherein the first RAN and the second RAN are configured within the wireless communication system as one of co-located or neighboring.

11. A network device comprising:

at least one network communication interface communicatively coupled to both a first radio access network (RAN) and a second RAN, wherein the first RAN is configured to serve wireless communication devices (WCDs) on a first air interface according to a first air interface protocol, and the second RAN is configured to serve WCDs on a second air interface according to a second air interface protocol; and one or more processors for executing instructions that cause the network device to carry out functions including:

receiving information indicative of a requested spectral efficiency for a wireless service requested of the first RAN by a WCD, wherein the information is received by the network device from the first RAN upon receipt by the first RAN on the first air interface of a message from the WCD requesting the wireless service, the information being included in the message, and wherein the spectral efficiency corresponds to a metric of bit rate per utilized bandwidth, based on the information, determining the requested spectral efficiency for providing the requested wireless service on the first air interface of the first RAN according to the first air interface protocol, making a comparison of the requested spectral efficiency with at least one of (a) a threshold, or (b) a projected spectral efficiency for providing the requested wireless service on the second air interface of the second RAN according to the second air interface protocol, and based on the comparison, providing the WCD the requested wireless service on one of (i) the first air interface of the first RAN according to the first air interface protocol, or (ii) the second air interface of the second RAN according to the second air interface protocol; wherein the requested wireless service comprises a wireless communication service.

12. The network device of claim 11, wherein the information includes a channel quality indicator (CQI) index, and wherein determining the requested spectral efficiency for providing the requested wireless service on the first air interface of the first RAN comprises looking up a spectral efficiency in a CQI table based on the CQI index.

13. The network device of claim 11, wherein, based on the comparison, providing the WCD the requested wireless service on one of (i) the first air interface of the first RAN according to the first air interface protocol, or (ii) the second air interface of the second RAN according to the second air interface protocol comprises:

determining a first ratio of the requested spectral efficiency to a first average spectral efficiency measured on the first air interface of the first RAN;

if the determined first ratio is greater than or equal to the threshold, then providing the WCD the requested wireless service on the first air interface of the first RAN according to the first air interface protocol;

if the determined first ratio is less than the threshold, then determining a second ratio of the projected spectral efficiency to a second average spectral efficiency measured on the second air interface of the second RAN;

if the determined first ratio is less than the threshold and the determined first ratio is also greater than or equal to the determined second ratio, then providing the WCD the requested wireless service on the first air interface of the first RAN according to the first air interface protocol; and if the determined first ratio is less than the threshold and the determined first ratio is also less than the determined second ratio, then providing the WCD the requested wireless service on the second air interface of the second RAN according to the second air interface protocol.

14. The network device of claim 13, wherein determining the first ratio comprises determining the first average spectral efficiency as a running time average of spectral efficiencies of communications carried on the first air interface between the first RAN and one or more WCDs served by the first RAN.

15. The network device of claim 13, wherein determining the second ratio comprises:

determining the projected spectral efficiency for providing the requested wireless service on the second air interface of the second RAN; and determining the second average spectral efficiency as a running time average of spectral efficiencies of communications carried on the second air interface between the second RAN and one or more WCDs served by the second RAN.

16. The network device of claim 15, wherein determining the projected spectral efficiency for providing the requested wireless service on the second air interface of the second RAN comprises:

determining a projected data rate supported on the second air interface of the second RAN between the second RAN and the WCD; and dividing the determined projected data rate by a bandwidth used for carrying communications on the second air interface of the second RAN between the second RAN and WCDs served by the second RAN.

17. The network device of claim 11, wherein the first air interface protocol is Long Term Evolution (LTE), and the first air interface operates according to LTE specifications, and wherein the second air interface protocol is selected from the group consisting of Evolution-Data Optimized (EVDO) and Universal Mobile Telecommunications System (UMTS), and the second air interface operates according to one of EVDO specifications or UMTS specification.

18. The network device of claim 11, wherein the first RAN and the second RAN are configured within a wireless communication system as one of co-located or neighboring, wherein the first RAN includes a base station having an air interface configured to operate according to the first air interface protocol, wherein the network device is at least one of co-located with the first RAN or co-located with the base station.

19. A non-transitory computer-readable medium having instructions stored thereon that, upon execution by one or more processors of a network device communicatively coupled to both a first radio access network (RAN) configured to serve wireless communication devices (WCDs) on a first air interface according to a first air interface protocol, and a second RAN configured to serve WCDs on a second air interface according to a second air interface protocol, cause the network device to carry out functions including:

receiving information indicative of a requested spectral efficiency for a wireless service requested of the first RAN by a WCD, wherein the information is received by the network device from the first RAN upon receipt by the first RAN on the first air interface of a message from the WCD requesting the wireless service, the information being included in the message, and wherein the spectral efficiency corresponds to a metric of bit rate per utilized bandwidth;

based on the information, determining the requested spectral efficiency for providing the requested wireless service on the first air interface of the first RAN according to the first air interface protocol;

making a comparison of the requested spectral efficiency with at least one of (a) a threshold, or (b) a projected spectral efficiency for providing the requested wireless service on the second air interface of the second RAN according to the second air interface protocol, and based on the comparison, providing the WCD the requested wireless service on one of (i) the first air interface of the first RAN according to the first air interface protocol, or (ii) the second air interface of the second RAN according to the second air interface protocol; wherein the requested wireless service comprises a wireless communication service.

20. The non-transitory computer-readable medium of claim 19, wherein, based on the comparison, providing the WCD the requested wireless service on one of (i) the first air interface of the first RAN according to the first air interface protocol, or (ii) the second air interface of the second RAN according to the second air interface protocol comprises:

determining a first ratio of the requested spectral efficiency to a first average spectral efficiency measured on the first air interface of the first RAN;

if the determined first ratio is greater than or equal to the threshold, then providing the WCD the requested wireless service on the first air interface of the first RAN according to the first air interface protocol;

if the determined first ratio is less than the threshold, then determining a second ratio of the projected spectral efficiency to a second average spectral efficiency measured on the second air interface of the second RAN;

if the determined first ratio is less than the threshold and the determined first ratio is also greater than or equal to the determined second ratio, then providing the WCD the requested wireless service on the first air interface of the first RAN according to the first air interface protocol; and if the determined first ratio is less than the threshold and the determined first ratio is also less than the determined second ratio, then providing the WCD the requested wireless service on the second air interface of the second RAN according to the second air interface protocol.

* * * * *